United States Patent
Arienzo

(10) Patent No.: US 6,683,044 B1
(45) Date of Patent: Jan. 27, 2004

(54) ANIMAL SCENT LURE AND DELIVERY SYSTEM

(76) Inventor: Gerald V. Arienzo, 630 Buckeye Cir., Conyers, GA (US) 30094

( * ) Notice: Subject to any disclaimer, the term of this patent is extended or adjusted under 35 U.S.C. 154(b) by 1 day.

(21) Appl. No.: 09/663,148

(22) Filed: Sep. 15, 2000

Related U.S. Application Data

(60) Provisional application No. 60/154,059, filed on Sep. 16, 1999.

(51) Int. Cl.⁷ ............................ A61K 7/46; A01M 31/00
(52) U.S. Cl. .................. 512/5; 512/1; 516/53; 446/15; 43/1; 510/405; 510/406; 119/711
(58) Field of Search ............................ 512/1, 5; 516/53; 446/15; 43/1; 510/405, 406; 119/711

(56) References Cited

U.S. PATENT DOCUMENTS

| | | | |
|---|---|---|---|
| 2,433,625 A | 12/1947 | Raspet | |
| 2,469,045 A | 5/1949 | La Vietes | |
| 3,968,262 A | 7/1976 | Hodska | |
| 4,133,779 A | 1/1979 | Hellyer et al. | |
| 4,284,534 A | 8/1981 | Ehrlich | |
| 4,316,824 A | 2/1982 | Pancheri | |
| 4,511,497 A | 4/1985 | Ehrlich | |
| 4,597,885 A | 7/1986 | Berry et al. | |
| 4,668,422 A * | 5/1987 | Malik et al. | 510/135 |
| 4,976,645 A | 12/1990 | Wesson et al. | |
| 5,112,525 A | 5/1992 | Straw et al. | |
| 5,246,631 A | 9/1993 | Halbritter | |
| 5,397,497 A | 3/1995 | Jakobson et al. | |
| 5,672,342 A * | 9/1997 | Bell | 222/175 |

* cited by examiner

*Primary Examiner*—Jill Warden
*Assistant Examiner*—Monique T. Cole
(74) *Attorney, Agent, or Firm*—Myers & Kaplan; Barry E. Kaplan

(57) ABSTRACT

Animal attractant bubbles are formed utilizing a bubble forming solution which includes a sufficient amount of a surface active agent to form the bubbles and a sufficient amount of a animal attractant agent, such as natural or artificial female animal estrous, to provide the attractant characteristic of the bubbles. The animal attractant agent may be natural or synthetic extracts, oils, olifactory agents, perfumes, and fragrances of plants.

2 Claims, No Drawings

ANIMAL SCENT LURE AND DELIVERY SYSTEM

RELATED APPLICATIONS

This non-provisional patent application claims priority based upon provisional patent application serial No. 60/154,059, filed on Sep. 16, 1999.

BACKGROUND OF THE INVENTION

1. Field of the Invention

The present invention relates generally to aqueous bubble forming solutions; and, more particularly, to an improved aqueous bubble solution containing any of a variety of natural or artificial animal scents designed to attract an animal towards the source of the scent.

2. Description of Related Art

Bubble blowing is a long recognized and widely practiced pastime. In its simplest form, bubble blowing has typically involved dipping a ring-shaped article into a liquid soap solution, followed by blowing air into the ring to form one or more bubbles. Alternatively, the ring may be moved rapidly through the air in order to force air through the ring and thereby form the bubbles.

In recent years, however, an entire industry has arisen to promote and take advantage of the surge in popularity of this form of childhood entertainment and education. There have been advances both in mechanical toys designed to produce bubbles rapidly and in large quantity, and in toys designed to affect the size and consistency of the bubbles. The goal of each of these advances has been to enhance the child's experience and level of excitement in practicing this pastime.

In spite of the many mechanical advances made in this industry, there have not been many advances in the formulation of the standard bubble solution. A wide variety of bubble forming kits are available in the marketplace for consumer use. The kits typically include a non-toxic bubble forming solution packaged in a suitable container and some type of ring-shaped device for use in forming the bubbles. As an alternative to using commercially available bubble forming kits of the type described, children or their guardians often mix homemade bubble solutions utilizing liquid detergents, such as liquid dishwashing detergents, and then blow bubbles using home-made ring shaped devices which can be made from a variety of common household items or materials.

Similarly, there have been developed and brought to market scented animal attractants. Such scented animal attractants have been developed primarily for the hunting industry, as, for example, deer lures. These scented animal attractants typically either are natural or artificial formulations comprising or approximating the female estrous for the species sought to be attracted. The most notable examples may be found with reference to the deer hunting industry. Wellington Leisure Products, Inc., for example, provides to the market a natural deer estrous solution for use by hunters in attracting male deer, or bucks. Other companies provide similar, but often artificially formulated, products.

In use, a hunter will spread the scented deer attractant about the area in which he is hunting. The attractant may be placed upon the ground, upon tree trunks, or the like. The process is time intensive and consumes a substantial amount of the solution. Although several commercial enterprises provide such attractants, none provide a delivery system for the attractant designed to enhance the effectiveness of the attractant and reduce the time for its effective distribution.

Since enhancement of the bubble formulation during recreational and educational activities has been limited, for the most part, to improving the size, number, quantity, or rate of production of the bubbles, it would, therefore, be desirable to provide a new dimension to bubble formulations in order to utilize the bubble formulation to enhance the distribution of a scented animal attractant of the type hereinabove described. Accordingly, it would be desirable to provide a bubble solution containing any of a variety of natural or artificial scented animal attractants designed to enhance the distribution of the attractant.

It would be further desirable to add any of a variety of natural or artificial scented animal attractants to the standard bubble forming solution to increase the efficacy of the attractant and to enhance the enjoyment of sport hunting using any of the devices previously referenced, under a wide variety of conditions. It is, therefore, to these ends that the present invention has been developed.

Accordingly, it is an object of the present invention to provide a bubble forming solution containing any of a variety of natural or artificial scented animal attractants.

It is another object of the present invention to provide a bubble forming solution containing any of a variety of natural or artificially scented animal attractants in order to add a new dimension to, and otherwise enhance, the sport hunting experience.

It is a further object of the present invention to provide a bubble forming solution containing any of a variety of natural or artificial scented animal attractants in order to increase the efficacy of the attractant and its method of distribution.

It is a still further object of the present invention to provide a bubble forming solution containing any of a variety of natural or artificial scented animal attractants, which solution will be compatible with the many mechanical bubble forming devices available in the market.

These and other objects, features, and advantages of the present invention will become more apparent to one ordinarily skilled in the art from a review of the following Detailed Description of the Preferred Embodiment.

SUMMARY OF THE INVENTION

In accordance with the objectives of the present invention, provided is a bubble forming solution for developing a bubble that carries with it through the air any of a variety of artificial or natural scented animal attractants. When the bubble formed from this solution eventually collapses, it releases into the surrounding air, in the form of atomized droplets, a sudden burst of natural or artificial scented animal attractants. This sudden burst of attractant has been observed to substantially enhance the effectiveness of the natural or artificial scented animal attractants in their operation as an animal lure. This is so because the bubble distribution mechanism allows the attractant to be targeted and distributed more easily, conveniently, and over a wider area than would be normally provided according to traditional hand distribution methods. The atomized solution so developed distributes tiny droplets over an entire area, so that the overall efficacy of the attractant is thereby multiplied. The solution naturally is distributed by air movement according to the line of smell of the animal.

Animals have been observed to more readily follow the attractant so distributed. The attractant bubbles in accordance with the present invention, thus blown, not only are appealing in smell to the animal, but significantly enhance the efficacy of the attractant. Greater numbers of animals may be attracted with less work on the part of the sportsman.

The present invention is based upon the discovery that attractant agents, including estrous solutions of natural or artificial origin, can be added to conventional bubble forming solutions in amounts which are sufficient to provide animal attractant bubbles without deleteriously affecting the capability of the solution to form suitable bubbles. A bubble forming solution in accordance with the present invention, thus, includes a sufficient amount of a surface-active agent to provide formation of the bubbles when a gas is introduced into contact with the solution and a sufficient amount of an attractant to provide the aromatic component of the bubbles.

As a feature of the present invention, the attractant agent may be any of a variety of natural or artificial agents, formed from either natural or manmade extracts of animal or plant origin, to provide the attractant component of the bubble. The attractant agent, selected from the group consisting of extracts, oils, olifactory agents, and perfumes, can be added to the bubble forming solution in amounts up to about eighty (80) volume percent.

As a feature of the present invention, it was discovered that bubble hardeners, well known in the prior art, such as glycerin, may also be added to the bubble forming solution in amounts up to about one volume percent to enhance bubble formation and stability. It was discovered that the addition of the bubble hardener does not adversely affect the bubble formation or attractant properties of the bubble forming solution in accordance with the present invention.

The present invention provides a simple and effective method for enhancing bubbles with animal attractants for use in a wide variety of educational, entertainment, and recreational settings. The attractant bubbles in accordance with the present invention provide an especially attractive bubble with unique properties to enhance the efficacy of the attractant according to its intended used.

DETAILED DESCRIPTION OF THE PREFERRED EMBODIMENT

In describing the preferred and alternate embodiments of the present invention, specific terminology is employed for the sake of clarity. The invention, however, is not intended to be limited to the specific terminology so selected, and it is to be understood that each specific element includes all technical equivalents that operate in a similar manner to accomplish similar functions.

The present invention involves animal attractant lures, bubble forming solutions, and the solutions used in their preparation. The bubble forming solutions in accordance with the present invention have wide application for use in a variety of bubble forming devices. The animal attractant bubble forming solution of the present invention may be used in simple ring-shaped bubble forming devices intended for personalized use. The animal attractant bubble forming solution also is suitable for the forming of bubbles on a larger scale by mechanized devices or equipment.

The present invention is based upon the addition of any of a variety of natural or artificial scented animal attractant agents to an otherwise conventional bubble forming solution. The animal attractant agent can be added to a variety of bubble forming solutions, provided that there is no deleterious reaction between the animal attractant agent and the bubble forming solution.

Suitable bubble forming solutions may include anionic, cationic, non-ionic, and ampholytic surfactants. Many of the conventional solutions utilized in bubble forming kits or in conjunction with bubble forming devices are suitable, either alone or in conjunction with the addition of a sufficient amount of surface active agent, also sometimes call "surfactant," to provide formation of bubbles when a gas is introduced into contact with the solution. Solutions containing conventional surfactants, such as sodium laureth sulfate or ammonium laureth sulfate may be utilized.

Preferred bubble forming solutions are commercially available in toy stores. The liquid typically is used full-strength; however, it may be diluted with water to provide the desired consistency of bubbles depending upon the types of bubbles desired. The amount of water, if any, used to dilute the liquid is not particularly critical and can be varied, as is well-known in the art, to achieve desired bubble consistency.

The animal attractant agent which is added to the bubble forming solution in accordance with the present invention may be selected from any of a wide variety of natural or artificial animal scents designed to attract an animal towards the scent. The preferred animal attractant agent, however, includes a natural extract of female animal estrous to provide the emission of scented attractant. This particular attractant scent emitting compound and resulting olfactory and biological reaction to the male of the species is well-known and forms the basis for a variety of scented lure compositions, including conventional deer lure products.

The composition and chemistry of exemplary animal attractant agents is well known in the hunting industry. A particularly preferred animal attractant agent for use in accordance with the present invention is Wellington Leisure Products, Inc.'s buck lure, which is commercially available in a variety of public marketplaces. Other preferred animal attractant agents for use in accordance with the present invention include synthetic or artificial equivalents of the natural female estrous.

Bubble hardeners, such as glycerin, and bubble stabilizers, such as are described in detail in U.S. Pat. No. 4,316,824, may also be added to the bubble forming solution in accordance with the present invention. Up to about one percent (1%) by volume bubble hardener may be added to the solution with approximately 0.2 percent being preferred. Up to about twenty (20) volume percent bubble stabilizer may be added to the solution with approximately two to eight (2–8) volume percent being preferred.

The amount of animal attractant agent which can be added to the bubble forming solution may be varied in order to provide the desired degree of scent. Preferably the amount of animal attractant agent will not exceed about eighty (80) volume percent. Larger amounts of animal attractant agent do not substantially increase the amount of scent emitted and also tend to reduce bubble quality.

An example of practice of the present invention involves using a non-toxic liquid bubble forming solution, such as JACK & JILL® brand, available from Manhattan Products, Inc. (Carlstadt, N.J.). Although the JACK & JILL® solution may be diluted with varying amounts of water, it is preferred that the liquid be used at full strength. Animal attractant is added to this solution in concentrations up to the exemplary percentage. Bubble hardeners may then be added to the solution in concentrations up to the exemplary composition. The solution is then ready for use to form attractant bubbles.

In use, a bubble solution of the formulation described above is used in developing a bubble. Bubbles may be developed according to any of the methods of production is well-known in the art. For example, they may be formed according to blowing rings, mechanical air movement devices, or the like. The bubble so formed carries with it through the air the natural or artificial scented animal attractants.

When the bubble formed from this solution eventually collapses, it releases into the surrounding air, in the form of atomized droplets, a sudden burst of natural or artificial scented animal attractants. This sudden burst of attractant has been observed to substantially enhance the effectiveness of the natural or artificial scented animal attractants in their operation as an animal lure. This is so because the bubble distribution mechanism allows the attractant to be targeted and distributed more easily, conveniently, and over a wider area than would be normally provided according to traditional hand distribution methods. The atomized solution so developed distributes tiny droplets over an entire area, so that the overall efficacy of the attractant is thereby multiplied. The solution naturally is distributed by air movement according to the line of smell of the animal.

While the exemplary solution and method has been provided as a deer attractant for sports hunting use, it will be apparent to those ordinarily skilled in the art that other animal attractants may be used in other fields of animal sport, education, nature conservancy, and the like, according to the species of animal sought to be attracted. Accordingly, this invention is not intended to be limited to deer lure distribution systems.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

I claim:

1. A method of distribution of a scented animal attractant lure comprising the steps of:

(a.) forming a bubble comprising an animal attractant; and, (b.) releasing said bubble into the air;

whereby the bubble may travel according to natural or artificial air currents in order to more effectively target and geographically distribute the animal attractant.

2. The method of claim 1, wherein said bubble of steer (a) is formed from a solution comprising a sufficient amount of surface active agent to allow formation of said bubble, along with a sufficient amount of animal attractant agent to provide the attractant nature of said bubble; and further comprising the step of:

(c) releasing said animal attractant, in the form of atomized droplets.

* * * * *